United States Patent [19]
Kobayashi

[11] 4,220,217
[45] Sep. 2, 1980

[54] TRANSMISSION CONTROL DEVICE FOR TILT CAB TYPE VEHICLE

[76] Inventor: Kuniaki Kobayashi, c/o Hino Kojo of Hino Tidasha Kogyo Kabushiki Kaisha 3-1-1, Hinodai, Hino-shi, Tokyo, Japan

[21] Appl. No.: 938,311

[22] Filed: Aug. 29, 1978

[30] Foreign Application Priority Data

Sep. 14, 1977 [JP] Japan .......................... 52/124059[U]
Sep. 14, 1977 [JP] Japan .......................... 52/124060[U]
Jul. 19, 1978 [JP] Japan ............................ 53/99252[U]

[51] Int. Cl.² ............................................. B62D 33/06
[52] U.S. Cl. ................................. 180/328; 180/89.14; 74/473 R
[58] Field of Search ............. 180/77 TC, 89.16, 89.15, 180/89.14; 74/473 R

[56] References Cited

U.S. PATENT DOCUMENTS 3,329,229 7/1967 Mukho ................................. 74/473 R
3,926,068 12/1975 Jantzen ................................ 180/89.14

FOREIGN PATENT DOCUMENTS 2037310 4/1971 Fed. Rep. of Germany ........ 74/473 R
2264121 7/1973 Fed. Rep. of Germany ........ 180/89.14

*Primary Examiner*—Robert R. Song
*Attorney, Agent, or Firm*—Wenderoth, Lind & Ponack

[57] ABSTRACT

A transmission control device for a tilt cab type vehicle is composed of a bearing which is mounted on the cab floor of the vehicle and which has a partially spherical bearing bore. A change lever is received in and held by the bearing and has the lower end extending through the bearing. A shift selection lever is mounted on the chassis below the cab and is connected at its lower end to a control rod. In addition, there is a neutral positioning spring which is adapted to maintain the change lever in its neutral position as the cab is tilted. The change lever has at its extreme lower end a yoke which has a pair of aligned openings. The shift selection lever has at the upper end an arm pin which is associated with a ball joint to be received in the aligned openings when the cab is in its normal position and the ball joint is disengaged from the aligned openings when the cab is placed in a tilted position.

11 Claims, 5 Drawing Figures

TRANSMISSION CONTROL DEVICE FOR TILT CAB TYPE VEHICLE

BACKGROUND OF THE INVENTION

This invention relates to improvements in and relating to a transmission control device for a tilt cab type vehicle.

There have been proposed and practically employed a variety of transmission control devices for tilt cab type vehicles. One type of prior art vehicle transmission control devices is one in which the change gear is connected to the control rod through a link mechanism regardless of whether the cab is in its normal lowered or horizontal position or its tilted position. Another type of the prior art vehicle transmission control devices is one in which, when the cab is tilted, the change lever is disconnected from the control rod. The vehicle transmission control device of the present invention is of the latter type.

In the prior art latter type transmission control devices for a tilt cab type vehicle, since the change lever which is mounted on the cab is not allowed to move vertically with respect to the cab floor, the flare portion of the ball socket on the change lever is required to have a rather large size change lever and shift selection lever when the cab is lowered to the normal horizontal position from a tilted position.

The large size flare portion is undesirable in view of the limited space which is provided between the chassis and cab in the vehicle.

Furthermore, in the prior art latter type transmission control devices of the described type vehicle, when shifting the change lever and the meshing gears within the transmission are selectively engaged, the noise arising between the meshing gears within the transmission augments in the connection between the change lever and shift selection lever and the resulting vibration of the transmission is transmitted through the shift selection lever to the change lever to thereby giving an uncomfortable touch or feeling to the hands on the change lever when the change lever is shifted.

SUMMARY OF THE INVENTION

Therefore, one object of the present invention is to provide a transmission control device for a tilt cab type vehicle in which the connection mechanism interconnecting the change lever on the cab and the shift selection lever on the chassis, is of a reduced size which is sufficient to be suitably positioned in a limited space between the cab and chassis in the vehicle and insure a positive connection between the two levers. The change lever and shift selection lever are maintained connected in spite of wear on the parts of the connection mechanism. Further, the rocking of the change lever is prevented while the vehicle, is running and any noise which may arise due to the rocking of the change lever is eliminated.

Another object of the present invention is to provide a transmission control device for a tilt cab type vehicle in which in the shifting operation of the change lever, when the change lever is shifted and the meshing gears within the transmission are selectively engaged, the noise arising from the meshing gears within the transmission and the vibration of the transmission are prevented from being transmitted through the shift selection lever to the change lever thereby improving the touch or feeling on the change lever when the change lever is shifted and thereby also preventing the noise arising from the meshing gears within the transmission and the vibration of the transmission from increasing in the connection between the change lever and shift selection lever.

Another object of the present invention is to provide a transmission control device for a tilt cab type vehicle in which when the cab is in its normal lowered or horizontal position, the change lever which mounted on the cab is positively connected to the shift selection lever which is mounted on the chassis to prevent the change lever from rocking while said vehicle is running and thereby preventing the generation of noise and knocking against the driver's foot which would arise otherwise due to the rocking of said change lever.

The above and other objects and advantages of the present invention will become more readily apparent to those skilled in the art from the following description when read in connection with the accompanying drawings, in which:

DETAILED DESCRIPTION OF THE DRAWINGS

Figure 1:
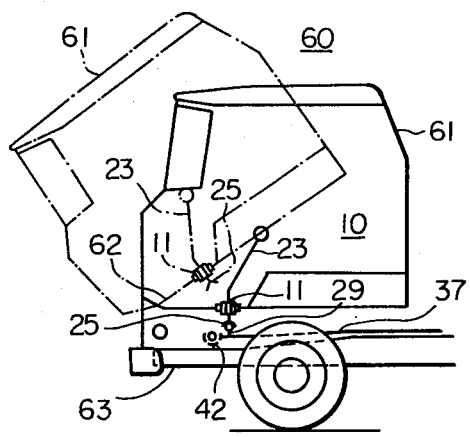
FIG. 1 is a schematic view of one embodiment of the transmission control device of the present invention as applied to a tilt cab type truck.
Figure 2:
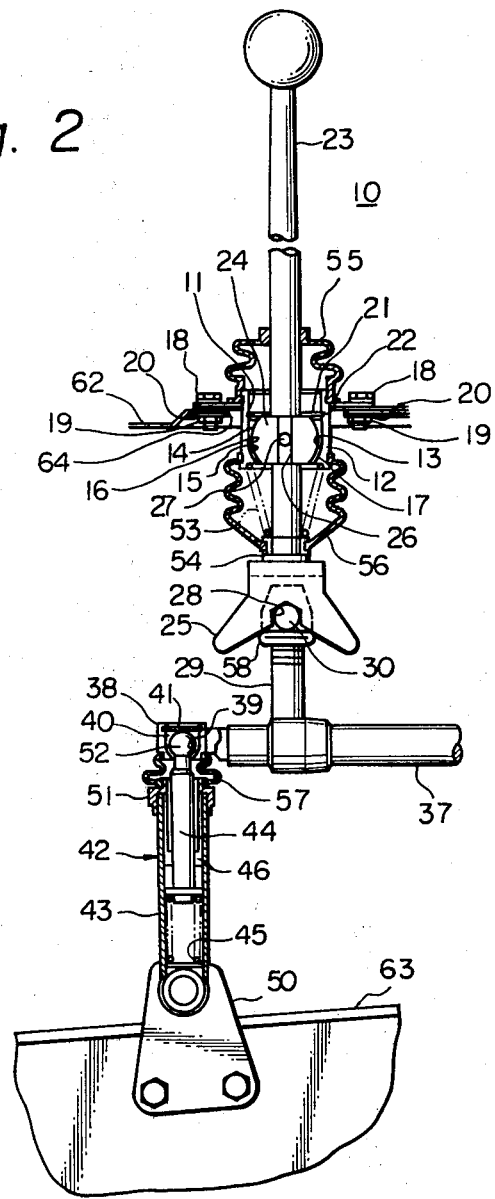
FIG. 2 is a fragmentary side elevational view in partial section on an enlarged scale showing the change lever and shift selection lever in their connection condition in the transmission control device as shown in FIG. 1.
Figure 3:
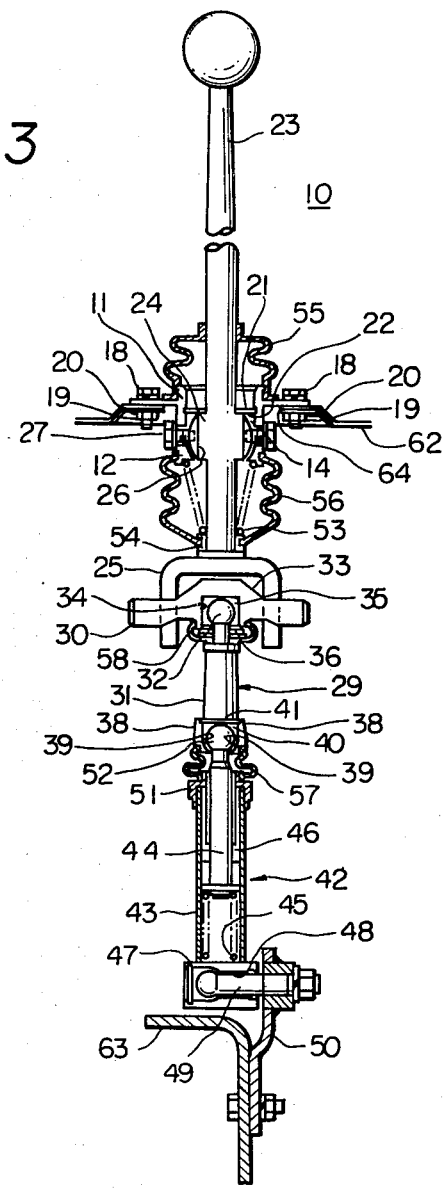
FIG. 3 is a fragmentary front elevational view in partial section on an enlarged scale showing the change lever and shift selection lever in their connected condition in the transmission control device as shown in FIG. 1.

Referring to FIGS. 1 through 3, in these Figures, a preferred embodiment of a transmission control device for a tilt cab type vehicle according to the present invention is generally shown by reference numeral 10 and is directed to a tilt cab type truck 60.

The transmission control device 10 generally comprises a bearing 11 which is mounted on the floor 62 of the cab 61. A change lever 23 is received in and held by the bearing 11, with the base or lower end of the lever extending through the bearing. A shift selection lever 29 is mounted on the chassis or a longitudinal frame member 63 thereon so that the shift selection lever is connected to the change lever when the cab 61 is in its normal or horizontal position and the shift selection lever is disconnected from the change lever when the cab 61 is tilted from the normal position and a neutral positioning spring 53 is adapted to hold the change lever 23 in its neutral position with respect to the floor 62 of the cab when the cab 61 is tilted.

The bearing 11 comprises a housing 12 which is received in an opening 64 in the floor 62 and the bearing 11 is held in position in the opening by means of a bolt 18 and a nut 19, with a washer 20 interposed therebetween and a ball seat 14 is received in a bearing bore 13 located in the housing 12. The inner periphery of a lower portion of the bearing bore 13 has a spherical shape, and the ball seat 14 also has the inner and outer peripheries 16 and 17 having a semi-spherical shape.

The lower end of the change lever 23 extends downwardly through the bearing 11 and floor 62 and has a barrel portion 24 which is received in and held by the bearing 11. The extreme lower end of the change lever 23 is threaded for threadingly receiving a yoke 25. The barrel portion 24 has a spherical outer peripheral surface and is held in position in the bearing 11 by means of a snap ring 21 and having a washer 22 interposed therebetween so that the change lever 23 can rotate relative to the bearing 11 and is held in position in the ball seat 14 when the spherical barrel portion 24 is received in the bearing bore 13 and more particularly, in the ball seat 14. Furthermore, the barrel portion 24 of the change lever 23 has a longitudinal groove 26 located in the spherical outer peripheral surface for threadingly receiving a set screw 27 which regulates the mounting position of the cab 61 on the floor 62.

The above-described yoke 25 has a pair of legs which have aligned openings 28.

The upper end of the shift selection lever 29 has a transverse arm pin 30 which frictionally engages a ball joint and the lower end of the shift selection lever 29 is welded to a control rod 37. That is, the shift selection lever 29 comprises a ball stud 31 and the arm pin 30 which is frictionally engaged by the ball portion 32 of the stud 31.

The arm pin 30 has a boss portion 33 which has a socket bore 34 in which the ball portion 32 of the ball stud 31 is received so that the arm pin 30 is mounted on the ball stud 31 for rotation relative to the ball stud when acted upon by the yoke 25. In order that the arm pin 30 is smoothly rotated by the yoke 25 relative to the ball stud 31, there is interposed a bearing 35, between the ball portion 32 and socket bore 34. The bearing 35 is held in position in the socket bore 34 by means of a snap ring 36.

The shift selection lever 29 is attached to the control rod 37 which has one end held by lift means 42 and the other end connected through an equalizer bar (not shown) to the transmission (not shown).

The lift means 42 includes a support tube 43, a lift rod 44 which is slidably received in the support tube 43 for reciprocal movement therein, a coiled spring 45 which is received in the support tube 43 which normally biases the lift rod 44 upwardly, and a sleeve 46 is interposed between the support tube 43 and lift rod 44.

The support tube 43 has a hollow boss 47 located at the lower end thereof which has a bore 48 in which a pin 49 is received for securing the support tube 43 to a bracket 50 on the chassis. The upper end of the support tube 43 is threaded for threadingly receiving a threaded cap 51 thereon to thereby prevent the lift rod 44 and sleeve 46 from slipping out of the support tube 43.

The upper end portion of the lift rod 44 extends upwardly beyond the adjacent end of the support tube 43 and more particularly, the upper or outer surface of the cap 51. The left rod 44 has a ball portion 52 integrally formed at the extreme upper end thereof. The ball portion 52 is received in the bearing bore 30 of the boss 38 on the control rod 37 for holding up the leading end of the control rod 37. A ball seat 40 is interposed between the ball portion 52 and bearing bore 39 and is held in position by means of a snap ring 41.

A neutral positioning spring 53 is interposed between the housing 12 and a lock nut 54 for holding the change lever 23 in its neutral position with respect to the cab floor 62 when the cab 61 is tilted from its normal or horizontal position.

Bellows-type dust covers 55, 56 and 57 are provided in suitable positions on the bearing - change lever assembly 11 and 23 and control rod - left means assembly 37 and 42, respectively and similarly, a dust cover 58 is provided in a suitable position on the arm pin-ball stud assembly 30 and 31 for sealing assemblies from invading dust.

With the above construction and arrangement of the parts of the transmission control device 10 of the invention, when the cab 61 is in its normal lowered or horizontal position as shown in the solid lines in FIG. 1, the yoke 25 is received on the arm pin 30 and the change lever 23 is connected to the shift selection lever 29. Especially, when the cab 61 in its tilted position, the change lever 23 is maintained in its neutral position with respect to the cab floor 62 and the shift selection lever 29 is lifted up by the lift means 42 through the control rod 37. Therefore, the yoke 25 is positively received on the arm pin 30 which substantially remains unmoved, and the yoke 25 can be positively received again on the arm pin 30 in spite of the fact that the automobile body vibrates while the vehicle motor is running when the cab is tilted back to a horizontal position.

Thus, the operation of the change lever 23 is positively transmitted to the transmission through the shift selection lever 29, control rod 37 and equalizer bar.

When the cab 61 is tilted as shown in the phantom lines in FIG. 1, since the yoke 25 is disengaged from the arm pin 30, the change lever 23 is disconnected from the shift selection lever 29.

In such a case, the change lever 23 is maintained in its neutral position with respect to the cab floor 62 by the neutral positioning spring 53.

Figure 4:
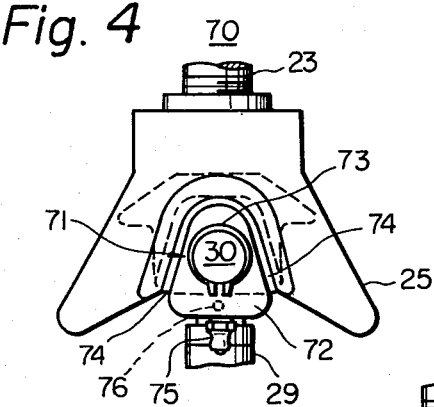
FIG. 4 is a fragmentary side elevational view on an enlarged scale of the connection between the change lever and shift selection lever in a modified embodiment of the transmission control device of the present invention.
Figure 5:
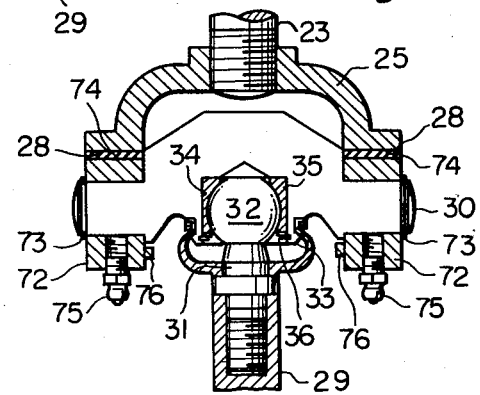
FIG. 5 is a fragmentary side elevational view in partial section on an enlarged scale of the connection between said change lever and shift selection lever in said modified embodiment of the transmission control device as shown in FIG. 4.

FIGS. 4 and 5 show another embodiment of the trasmission control device of the present invention and the part 70 is substantially the same is the part 10 as shown in FIGS. 1 through 3 except that a pair of noise dampers 71 are interposed between the arm pin receiving openings 28 in the legs of the yoke 25 and the arm pin 30 and thus, the overall construction of the embodiment of FIGS. 4 and 5 is fully appreciated by referring to FIGS. 1 through 3.

In the embodiment of FIGS. 4 and 5, each of the noise dampers 71 is rotatably received on the associated end of the arm pin 30 and held in position on the arm pin end by means of a snap ring 73. There is further included a bearing 72 which is received in the associated arm pin receiving opening 28 in one of the yoke legs, and a web-shaped buffering layer 74 is integrally formed on the upper outer peripheral surface portion of the bearing 72.

The bearing 72 is made of a conventional sliding bearing material and has an oil supply opening 75. The bearing 72 has a greater wall thickness in the lower portion and a stop 76 projects therefrom on the inner side of the lower portion so that the smaller wall thickness upper portion on which the web-shaped buffering layer 74 is maintained is always positioned on the top. When the bearing 72 is not provided having a lower portion having greater wall thickness in order to insure that the web-shaped buffering layer 74 is positioned on the top, a spring (not shown) is required. The spring can be also provided when the bearing 28 has the greater wall thickness on the lower portion.

Furthermore, when the bearing 72 is either a collar, sleeve, bush or the like, the web-shaped buffering layer 74 is wound about the entire peripheral surface of the bearing 72.

The web-shaped buffering layer 74 is formed by applying a rubber band about the bearing 72 or by applying a Nylon coating to the peripheral surface of the bearing 72.

It is also possible to integrally apply a metal protection layer (not shown) to the outer peripheral surface of the bearing 72 to protect the bearing 72 against wear.

Furthermore, the web-shaped buffering layer 74 can be directly wound about the arm pin 30 and in this case, the bearing 72 can be eliminated.

The operation of the transmission control device 70 of FIGS. 4 and 5 will be now described with reference to FIGS. 1 through 3. When the cab 61 is in its normal lowered or horizontal position as shown in the solid lines in FIG. 1, the yoke 25 is received on the arm pin 30 with the noise dampers 71 positioned therebetween and the change lever 23 being connected to the shift selection lever 29. When the cab 61 is in its tilted position, the change lever 23 is maintained in its neutral position with respect to the cab floor 62 by the neutral positioning spring 55 and the shift selection lever 29 is lifted up by the lift means 42 through the control rod 37. Therefore, the yoke 25 is positively received on the arm pin 30 for positioning the noise dampers 71 therebetween and the yoke 25 is positively maintained in engagement with the arm pin 30 with the noise dampers 71 positioned therebetween in spite of the fact that the vehicle body is vibrating during the running of the vehicle.

Thus, the movement of the change lever 23 is transmitted through the shift selection lever 29, control rod 37 and equalizer bar to the transmission.

In the operation of the change lever 23, when the change lever is shifted and the meshing gears within the transmission are selectively engaged, although the noise arising between the meshing gears in the transmission and the vibration of the transmission are transmitted through the equalizer bar and control rod 37 to the shift selection lever 29, the noise and rocking can be absorbed or substantially minimized by the noise 71 and the transmission of the noise and vibration to the change lever 23 can be substantially eliminated thereby resulting in the touch or feeling on the change lever 23 when the change lever 23 is shifted being improved and further the noise and vibration does not increase in the connection between the change lever and shift selection lever.

When the cab 61 is tilted as shown in the phantom line in FIG. 1, since the yoke 25 is disengaged from the noise dampers 71 and accordingly, from the arm pin 30, the change lever 23 and shift selection lever 29 are disengaged from each other.

When the change lever 23 and shift selection lever 29 are in the disengaged position, the change lever 23 is maintained in its neutral position with respect to the cab floor 62.

While some of the preferred embodiments of the present invention have been described with reference to the accompanying drawings, it will be understood that they are by way of examples, and that various modifications and changes may be made without departing from the spirit and scope of the invention, which is intended to be defined only by the following claims.

What is claimed is:

1. A transmission control device for a tilt cab type vehicle, said control device comprising:
    a bearing which is mounted on the cab floor of said vehicle and having a bearing bore therein;
    a change lever extending downwardly through said bearing bore and having a bearing portion engaged in said bearing bore and being supported therein for pivoting movement in any direction;
    yoke means attached to the lower end of said change lever and having a pair of downwardly open openings therein transversely spaced relative to the axis of said change lever and aligned with each other;
    a neutral positioning spring attached to said change lever for maintaining said change lever in substantially a neutral position when said cab is tilted and thereby maintaining said yoke in said substantially neutral position;
    a shift selection lever below said yoke means and having a ball on the upper end thereof;
    an arm pin having a socket therein in which the ball on said shift selection lever is frictionally fitted, said arm pin extending transversely of said shift selection lever and engaging in said aligned openings in said yoke for connecting said change lever and said shift selection lever when said cab is in a normal horizontal position and said yoke means being disengaged from said arm pin when said cab in tilted; and
    a control rod on the vehicle chassis and connected to the lower end of said shift selection lever for connecting said shift selection lever to the transmission.

2. A transmission control device as claimed in claim 1, wherein said change lever has a pratially spherical barrel portion adjacent to and above said yoke and said bearing bore has a spherical portion therein in which said barrel portion is engaged.

3. A transmission control device as claimed in claim 2, wherein said barrel portion has a vertical groove therein and further comprising a set screw which is threaded in said bearing and which has the leading end received in said vertical groove whereby the mounting position of said change lever on the floor of said cab is adjusted.

4. A transmission control device as claimed in claim 2, further comprising a ball seat located between said bearing and barrel portion.

5. A transmission control device as claimed in claim 1, further comprising noise damping means mounted on said arm pin for being positioned in said openings in said yoke means between said yoke means and said arm pin when said yoke means and said arm is engaged.

6. A transmission control device as claimed in claim 5, wherein said noise damping means comprises a pair of bearings which are received on opposite ends of said arm pin, and buffering layers which are integral with the upper outer peripheral surface of said bearings.

7. A transmission control device as claimed in claim 6, wherein said buffering layers are made of rubber.

8. A transmission control device as claimed in claim 6, wherein said buffering layers are made of synthetic resin material.

9. A transmission control device as claimed in claim 1, further comprising; a lift means located between the leading end of said control rod and said chassis for lifting said shift selection lever in a floating manner with respect to the chassis.

10. A transmission control device as claimed in claim 9, wherein said lift means comprises a support tube having a lower end pivotally mounted on the chassis, a lift rod slidably received in said support tube for reciprocal movement relative to said support tube, and a coiled spring located between said support tube and said lift rod for urging said lift rod upwardly.

11. A transmission control device as claimed in claim 10, wherein said lift means further comprises a sleeve located between said support tube and said lift rod for regulating the lifting position of said lift rod.

* * * * *